United States Patent
Yuan (10) Patent No.: US 7,607,641 B1
(45) Date of Patent: Oct. 27, 2009

(54) MICROFLUIDIC VALVE MECHANISM

(75) Inventor: Bob Yuan, Belmont, CA (US)

(73) Assignee: MicroFluidic Systems, Inc., Fremont, CA (US)

( * ) Notice: Subject to any disclaimer, the term of this patent is extended or adjusted under 35 U.S.C. 154(b) by 421 days.

(21) Appl. No.: 11/544,913

(22) Filed: Oct. 5, 2006

(51) Int. Cl.
*F16K 1/00* (2006.01)
*F16K 15/00* (2006.01)

(52) U.S. Cl. .................. 251/331; 251/61.1; 137/597

(58) Field of Classification Search .......... 251/61.1, 251/331; 137/597
See application file for complete search history.

(56) References Cited

U.S. PATENT DOCUMENTS

| | | | | |
|---|---|---|---|---|
| 4,852,851 A | * | 8/1989 | Webster | 251/61.1 |
| 5,765,591 A | * | 6/1998 | Wasson et al. | 137/597 |
| 5,816,457 A | * | 10/1998 | Croft | 224/148.2 |
| 6,615,871 B2 | * | 9/2003 | Ohmi et al. | 137/884 |
| 6,705,345 B1 | * | 3/2004 | Bifano | 137/597 |
| 7,216,528 B2 | * | 5/2007 | Gamache et al. | 73/23.41 |

* cited by examiner

*Primary Examiner*—John K Fristoe, Jr.
(74) *Attorney, Agent, or Firm*—Haverstock & Owens LLP (57) ABSTRACT

One or more diaphragm valves are integrated as part of a cover of a microfluidic cassette cartridge. A rigid body portion includes one or more recessed valve areas and a plurality of fluid channels. A recessed valve area is disposed along either a bottom surface or a top surface of the rigid body portion. An inlet fluid channel and an outlet fluid channel are formed within the rigid body portion of each recessed valve area. A flexible membrane cover is sealed over the bottom surface of the body portion, and another flexible membrane cover is sealed over the top surface. A portion of the membrane cover that covers a recessed valve area functions as a valve membrane of the diaphragm valve. The flexible membrane functions as both a cover of the cartridge, thereby sealing and enclosing the appropriate channels, and a valve membrane of the diaphragm valve.

28 Claims, 5 Drawing Sheets

MICROFLUIDIC VALVE MECHANISM

FIELD OF THE INVENTION

The invention relates to a valve. More particularly, the invention relates to valve mechanism applied to microfluidic pathways.

BACKGROUND OF THE INVENTION

Figure 1:
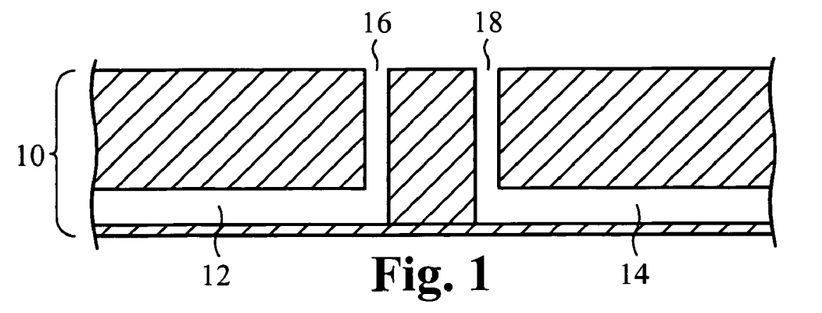
FIG. 1 illustrates an exemplary valve body of a conventional diaphragm valve.
Figure 2:
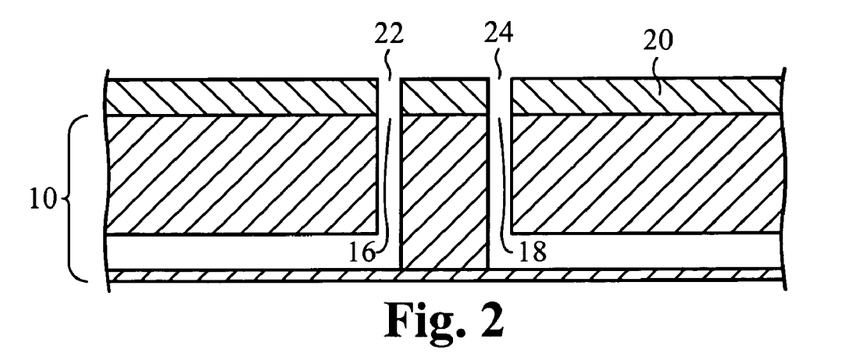
FIG. 2 illustrates the valve body of FIG. 1 including a cover.
Figure 3:
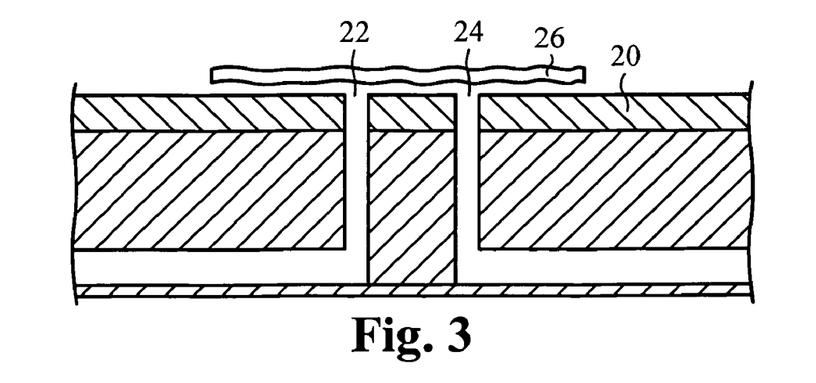
FIG. 3 illustrates a membrane positioned on the cover and valve body of FIG. 2.
Figure 4:
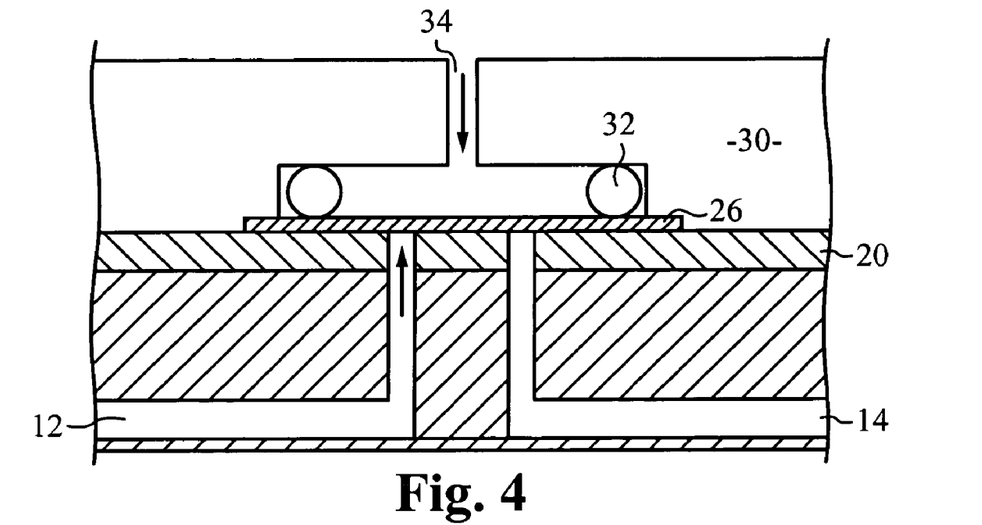
FIG. 4 illustrates the diaphragm valve of FIG. 3 actuated to a closed position.

Conventional diaphragm valves, also referred to as membrane valves, include a valve body with two or more ports, and a flexible membrane which closes the valve. FIG. 1 illustrates an exemplary valve body of a conventional diaphragm valve. The valve body 10 includes an inlet fluid passageway 12 including an inlet end 16, and an outlet fluid passageway 14 including an outlet end 18. A cover 20 (FIG. 2) is coupled to the valve body 10 such that a first opening 22 in the cover 20 is aligned with the inlet end 16, and a second opening 24 in the cover 20 is aligned with the outlet end 16. The valve body 10 and the cover 20 are both made of rigid material. A flexible membrane 26 (FIG. 3) is positioned on the cover 20 such that both the first opening 22 and the second opening 24 are covered. The membrane 26 is typically a separate piece of material from valve body 10 and the cover 20. A manifold 30 (FIG. 4) includes an o-ring 32 and an air passage 34. The manifold 30 is coupled to the cover 20 such that the membrane 26 is held in position over the openings 22 and 24 by the o-ring 32. The diaphragm valve is closed by applying air pressure to the membrane 26 via the air passage 34. The air pressure forces the membrane 26 against the cover 20, thereby blocking the openings 22 and 24. In this manner, fluid flowing through the inlet fluid passageway 16 is blocked from reaching the outlet fluid passageway 14, as shown in FIG. 4.

Figure 5:
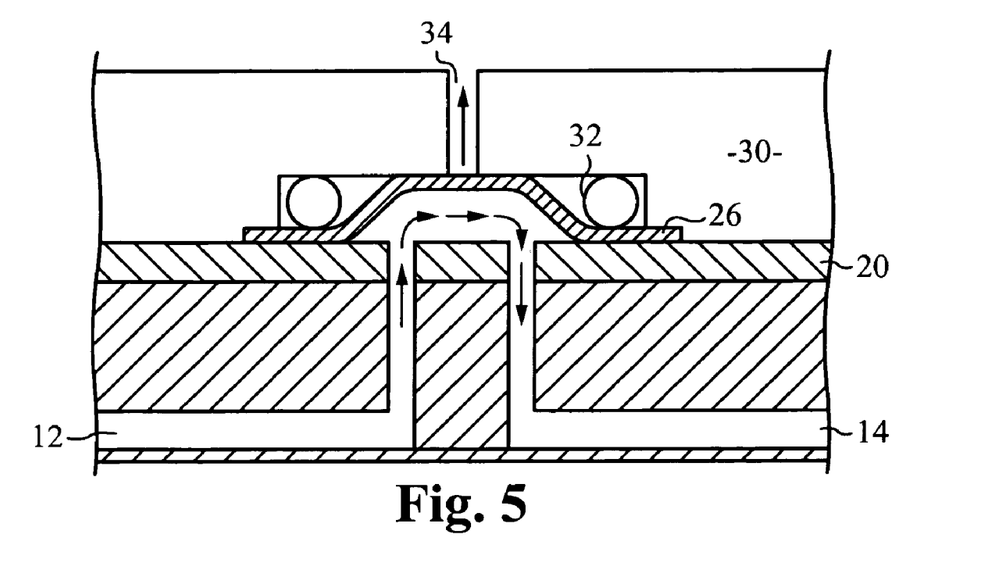
FIG. 5 illustrates the diaphragm valve of FIG. 3 actuated to an open position.

FIG. 5 illustrates the diaphragm valve in an open position. The diaphragm valve is open by applying vacuum to the membrane 26 via the air passage 34. The vacuum forces the membrane 26 away from the cover 20, thereby opening a fluid passage between the opening 22 and the opening 24. In this manner, a fluid passageway is generated enabling fluid flow from the inlet fluid passageway 16 to the outlet fluid passageway 14.

When the valve body 10 and the cover 20 are removed from the manifold 30, the loose piece of membrane 26 needs to be retrieved and either cleaned for reuse or discarded as waste. Additionally, the inlet and outlet fluid passageways are exposed, as well as any residual fluid therein.

Diaphragm valves are typically used as shut-off valves in process systems within the food and beverage, pharmaceutical and biotech industries. Conventional diaphragm valve designs are not well suited for regulating and controlling process flows.

SUMMARY OF THE INVENTION

One or more diaphragm valves are integrated as part of a cover of a microfluidic cassette cartridge. Diaphragm valves are used to control fluid flow through the cartridge. The cartridge includes a rigid body portion with a bottom surface and a top surface. The rigid body portion also includes one or more recessed valve areas and a plurality of fluid channels. A recessed valve area is disposed along either the bottom surface or the top surface of the body portion. An inlet fluid channel and an outlet fluid channel are formed within the rigid body portion of each recessed valve area. A flexible membrane cover is sealed over the bottom surface of the body portion, and another flexible membrane cover is sealed over the top surface.

A portion of the membrane cover that covers a recessed valve area functions as a valve membrane of the diaphragm valve. In this manner, the flexible membrane functions as both a cover of the cartridge, thereby sealing and enclosing the appropriate channels, and a valve membrane of the diaphragm valve. When pressure is applied to the valve membrane, a portion of the valve membrane is forced against the bottom surface of the recessed valve area, thereby blocking fluid from flowing between the inlet fluid channel and the outlet fluid channel.

In one aspect of the present invention, a valve mechanism includes a rigid body structure and a membrane cover. The rigid body structure includes a first surface and at least one recessed valve area configured within the first surface, wherein the rigid body structure further includes a plurality of fluid channels and each recessed valve area includes an inlet end of a first fluid channel and an outlet end of a second fluid channel. The membrane cover is sealed to the first surface of the rigid body structure such that each recessed valve area is sealed at the first surface by a portion of the membrane, thereby forming a valve membrane for each recessed valve area, wherein each valve membrane is configured to be actuated into a first position thereby providing a fluidic pathway between the inlet end of the first fluid channel and the outlet end of the second fluid channel, and a second position such that the valve membrane is extended into the recessed valve area thereby blocking the fluidic pathway between the inlet end of the first fluid channel and the outlet end of the second fluid channel. The valve membrane can be extended away from the recessed valve area while in the first position. The rigid body structure forms a bottom surface and a side perimeter surface of each recessed valve area. The inlet end of a first fluid channel and the outlet end of the second fluid channel are formed within the rigid body structure. The rigid body structure can also include a second surface and at least one recessed valve area configured within the second surface. In this case, the valve mechanism also includes a second membrane cover sealed to the bottom surface of the rigid body portion, thereby forming a valve membrane for each recessed valve area configured within the bottom surface. Each fluid channel formed within the rigid body structure includes at least one open-side, wherein each open-side is sealed by either the membrane cover sealed to the top surface or the membrane cover sealed to the bottom surface. The membrane cover can include a first layer and a second layer, wherein the first layer has a higher thermal melting point than the second layer, further wherein the second layer is sealed to the top surface. The top layer can be polyester and the second layer can be polyethylene. Each recessed valve area can include multiple inlet ends corresponding to multiple inlet fluid channels, multiple outlet ends corresponding to multiple outlet fluid channels, or multiple inlet ends corresponding to multiple inlet fluid channels and multiple outlet ends corresponding to multiple outlet fluid channels.

In another aspect of the present invention, a valve mechanism includes a rigid body portion and a flexible membrane cover. The rigid body portion includes a plurality of microfluidic channels and one or more recessed valve areas configured within a top surface of the rigid body portion, wherein the rigid body portion forms a bottom surface and a side perimeter surface of each recessed valve area such that a remaining side of each recessed valve area is open-sided, further wherein each recessed valve area includes an inlet end of a first channel and an outlet end of a second channel formed within the rigid body portion. The flexible membrane cover is sealed to the top surface of the rigid body such that each recessed valve area is sealed at the open-side by a portion of the flexible membrane cover, thereby forming a valve membrane for each recessed valve area, wherein each valve membrane is configured to be actuated into at least two positions, a first position such that the valve membrane is extended away from the bottom surface thereby providing a fluidic pathway between the inlet end of the first channel and the outlet end of the second channel, and a second position such that the valve membrane is extended toward the bottom surface thereby blocking the fluidic pathway between the inlet end of the first channel and the outlet end of the second channel. The valve mechanism can also include one or more recessed valve areas configured within a bottom surface of the rigid body portion, wherein the rigid body portion forms a bottom surface and a side perimeter surface of each recessed valve configured within the bottom surface such that a remaining side of each recessed valve area is open-sided, further wherein each recessed valve area includes an inlet end of one channel and an outlet end of another channel formed within the rigid body portion. In this case, the valve mechanism also includes a second flexible membrane cover sealed to the bottom surface of the rigid body portion, thereby forming a valve membrane for each recessed valve area configured within the bottom surface. Each microfluidic channel formed within the rigid body portion includes at least one open-side, wherein each open-side is sealed by either the flexible membrane sealed to the top surface or the flexible membrane sealed to the bottom surface. The flexible membrane can include a first layer and a second layer, wherein the first layer has a higher thermal melting point than the second layer, further wherein the second layer is sealed to the top surface. The top layer can be polyester and the second layer can be polyethylene. Each recessed valve area can include multiple inlet ends corresponding to multiple inlet fluid channels, multiple outlet ends corresponding to multiple outlet fluid channels, or multiple inlet ends corresponding to multiple inlet fluid channels and multiple outlet ends corresponding to multiple outlet fluid channels.

In yet another aspect of the present invention, a valve system includes a fluidic cartridge and a manifold. The fluidic cartridge includes a rigid body structure and a membrane cover. The rigid body structure includes a first surface and a plurality of recessed valve areas configured within the first surface, wherein the rigid body structure further includes a plurality of fluid channels and each recessed valve area includes an inlet end of a first fluid channel and an outlet end of a second fluid channel. The membrane cover is sealed to the first surface of the rigid body structure such that each recessed valve area is sealed at the first surface by a portion of the membrane, thereby forming a valve membrane for each recessed valve area, wherein each valve membrane is configured to be actuated into a first position thereby providing a fluidic pathway between the inlet end of the first fluid channel and the outlet end of the second fluid channel, and a second position such that the valve membrane is extended into the recessed valve area thereby blocking the fluidic pathway between the inlet end of the first fluid channel and the outlet end of the second fluid channel. The manifold is coupled to the fluidic cartridge, wherein the manifold includes a plurality of air passage, at least one air passage is aligned with each recessed valve area, further wherein the manifold is configured to apply air pressure to select ones of the plurality of recessed valve areas thereby actuating the corresponding valve membranes into the second position. The first position of the valve membrane can be a position external to the recessed valve area such that the valve membrane is extended away from the recessed valve area. In this case, the manifold is further configured to apply vacuum to select one of the plurality of recessed valve area thereby actuating the corresponding valve membranes into the first position. The rigid body structure forms a bottom surface and a side perimeter surface of each recessed valve area. The inlet end of the first fluid channel and the outlet end of the second fluid channel are formed within the rigid body structure. The rigid body structure can also include a second surface and at least one recessed valve area configured within the second surface. In this case, the valve system also includes a second membrane cover sealed to the bottom surface of the rigid body portion, thereby forming a valve membrane for each recessed valve area configured within the bottom surface. Each fluid channel formed within the rigid body structure includes at least one open-side, wherein each open-side is sealed by either the membrane cover sealed to the top surface or the membrane cover sealed to the bottom surface. The membrane cover can include a first layer and a second layer, wherein the first layer has a higher thermal melting point than the second layer, further wherein the second layer is sealed to the top surface. The top layer can be polyester and the second layer can be polyethylene. Each recessed valve area can include multiple inlet ends corresponding to multiple inlet fluid channels, multiple outlet ends corresponding to multiple outlet fluid channels, or multiple inlet ends corresponding to multiple inlet fluid channels and multiple outlet ends corresponding to multiple outlet fluid channels.

BRIEF DESCRIPTION OF THE DRAWINGS

Embodiments of the valve mechanism are described relative to the several views of the drawings. Where appropriate and only where identical elements are disclosed and shown in more than one drawing, the same reference numeral will be used to represent such identical elements.

DETAILED DESCRIPTION OF THE PRESENT INVENTION

Embodiments of the present invention are directed to a diaphragm valve integrated as part of a cover of a microfluidic cassette cartridge used in part to transport fluid. Diaphragm valves are used to control fluid flow through the cartridge. The cartridge includes a rigid body portion with a bottom surface and a top surface, a bottom cover positioned over the bottom surface of the body portion, and a top cover positioned over the top surface. The body portion includes a plurality of channels, a first portion of which are referred to as top channels and are disposed along the top surface, a second portion of which are referred to as bottom channels and are disposed along the bottom surface, and a third portion of which are referred to as connecting channels and are disposed from the bottom surface to the top surface. The bottom channels are enclosed except for an open-side facing away from the bottom surface. The top channels are enclosed except for an open side facing away from the top surface. The connecting channels are open ended at each end, a first end at the bottom surface and a second end at the top surface. Each channel functions as a fluid pathway.

A top cover is a flexible membrane sealed to the top surface of the body portion, thereby closing the open side of each of the top channels and the second end of each of the connecting channels. A bottom cover is also a flexible membrane sealed to the bottom surface of the body portion, thereby closing the open side of each of the bottom channels and the first end of each of the connecting channels. The body portion also includes one or more recessed valve areas. A recessed valve area is disposed along either the bottom surface or the top surface of the body portion. Where the recessed valve area is disposed along the top surface, the recessed valve area is a recessed area within the top surface such that the rigid body portion forms a bottom and a side perimeter and a remaining side of each recessed valve area is open-sided. An inlet fluid passageway and an outlet fluid passageway are formed within the rigid body portion of each recessed valve area. The inlet fluid passageway is the second end of a connecting channel. The outlet fluid passageway is the second end of a different connecting channel.

Where the recessed valve area is disposed along the bottom surface, the recessed valve area is a recessed area within the bottom surface. An inlet fluid passageway and an outlet fluid passageway are connected to the rigid body portion of each recessed valve area. The inlet fluid passageway is the first end of a connecting channel. The outlet fluid passageway is the first end of a different connecting channel.

The portion of the membrane that covers a recessed valve area functions as a valve membrane of the diaphragm valve. In this manner, the flexible membrane functions as both a cover of the cartridge, thereby sealing and enclosing the appropriate channels, and a valve membrane of the diaphragm valve. When pressure is applied to the valve membrane, a portion of the valve membrane is forced against the bottom surface of the recessed valve area, thereby blocking fluid from flowing between the inlet fluid passageway and the outlet fluid passageway. In some embodiments, the valve membrane covers the inlet fluid passageway, the outlet fluid passageway, or both. When a vacuum is applied to the valve membrane, the valve membrane is forced away from the bottom surface of the recessed valve area, thereby providing a fluid pathway between the inlet fluid passageway and the outlet fluid passageway. In some embodiments, the static, or non-actuated, position of the valve membrane allows fluid to flow from the inlet fluid passageway to the outlet fluid passageway. In this case, applying a vacuum is not necessary, but instead, application of the vacuum improves fluid flow between the inlet fluid passageway and the outlet fluid passageway.

Figure 6:
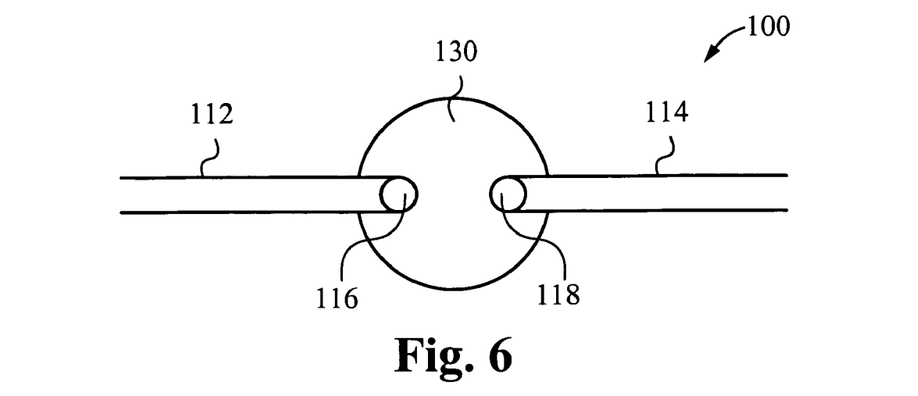
FIG. 6 illustrates a top-down view of an exemplary diaphragm valve configured according to the present invention.
Figure 7:
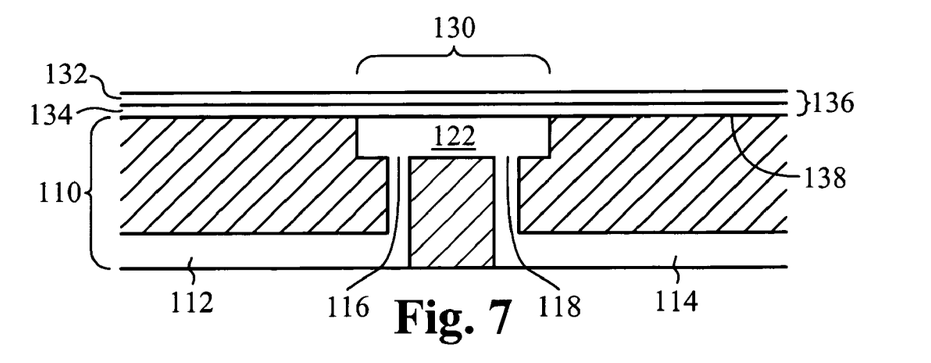
FIG. 7 illustrates a cut-out side view of the diaphragm valve of FIG. 6.

FIG. 6 illustrates a top-down view of an exemplary diaphragm valve configured according to the present invention. The diaphragm valve 100 includes a valve membrane 130, a first fluid pathway 112 including an inlet end 116, and a second fluid pathway 114 including an outlet end 118. FIG. 7 illustrates a cut out side view of the diaphragm valve 100. The first pathway 112 and the second pathway 114 are configured within a rigid body 110. The inlet end 116 and the outlet end 118 are connected to a recessed valve area 122 within the rigid body 110. The valve membrane 130 is part of a membrane cover 136, which is a cover for the rigid body 110. The membrane cover 136 includes at least two layers, a top layer 132 and a bottom layer 134. The top layer 132 has a higher thermal melting point than the bottom layer 134. For example, the top layer 132 is polyester and the bottom layer is polypropylene. In general, the membrane cover 136 is a flexible material that includes at least an adhering layer and a high melting temperature top layer. The membrane cover 136 can also include additional layers in between the adhering layer and the high melting temperature layer.

The membrane cover 136 is adhered to a top surface 138 of the rigid body 110, thereby sealing the recessed valve area 122. The portions of the rigid body 110 that contacts the membrane cover 136 are the ridges that define the perimeters of the fluid pathways and the recessed valve areas formed within the top surface of the rigid body. In some embodiments, the membrane cover 136 is adhered to the top surface 138 by applying a hot plate, or other heat generating device, to the top layer 132. The temperature of the hot plate is hot enough to melt the bottom layer 134, yet cool enough that the top layer 132 does not melt. Once the hot plate is removed, the bottom layer 134 adheres to the top surface 138 as the bottom layer 134 cools.

Figure 11:
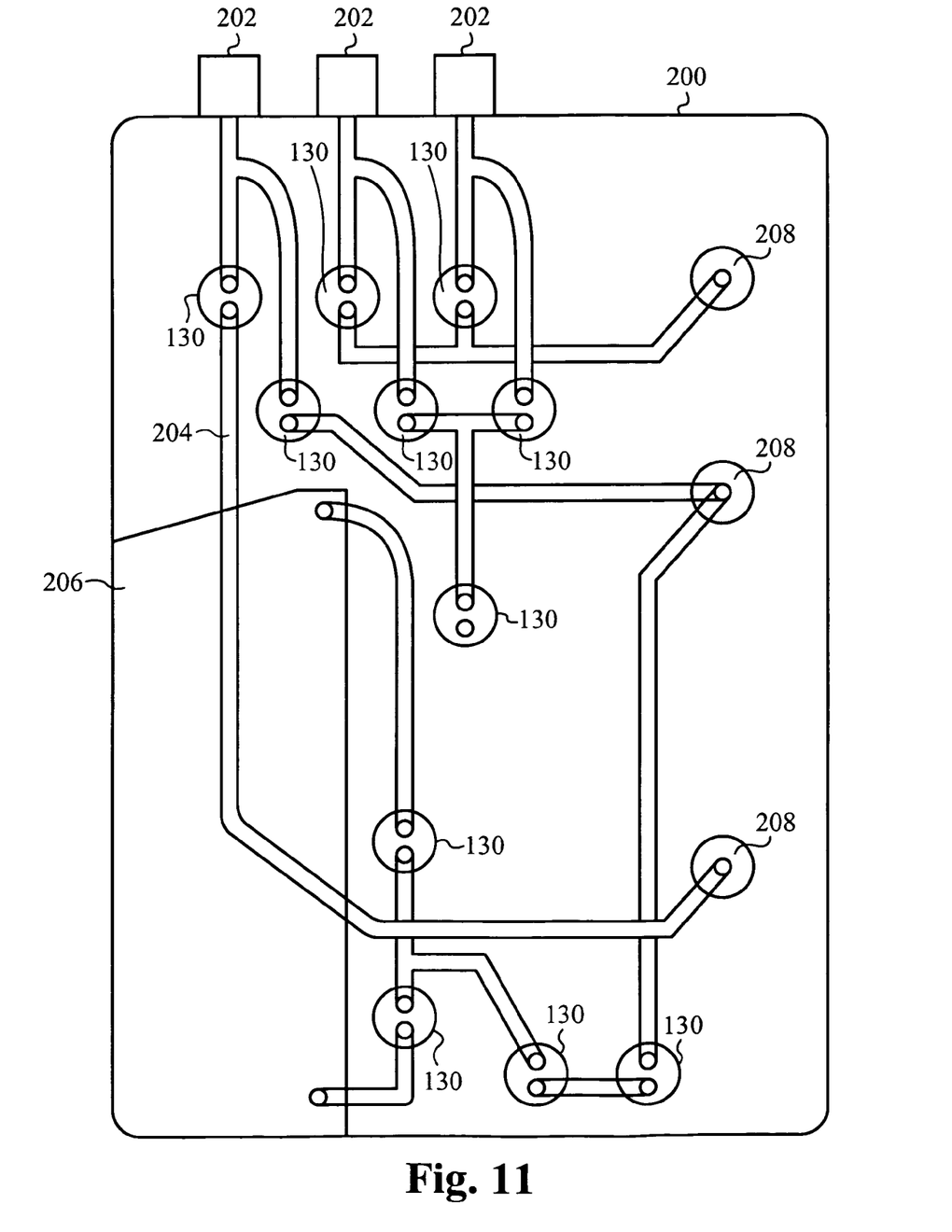
FIG. 11 illustrates a top-down view of an exemplary microfluidic cartridge utilizing the diaphragm valve of the present invention.

An application of the diaphragm valve 100 is within a microfluidic cartridge configured to transport and process fluid samples. FIG. 11 illustrates a top-down view of an exemplary microfluidic cartridge 200. The cartridge 200 includes a plurality of diaphragm valves 130, one or more fluid storage and processing areas 206, sample input ports 202, and solution input/output ports 208, all interconnected via microfluidic pathways 204. The cartridge 200 is used, for example, to process a fluid sample including biological particles. In some embodiments, the cartridge 200 is made of a rigid body portion, such as the rigid body 110 in FIG. 7, onto which a top membrane cover (not shown) and a bottom membrane cover (not shown) are adhered. In some embodiments, the rigid body portion is a single piece, injection molded plastic, such as polypropylene. The microfluidic pathways 204 are formed within the rigid body portion and are enclosed by one or more of the two membrane covers. The microfluidic pathways are formed into either a top surface or a bottom surface of the rigid body portion. When formed in the top surface, the top membrane cover functions to enclose the microfluidic pathway. When the microfluidic pathway is formed in the bottom surface, the bottom membrane cover functions to enclose the microfluidic pathway. Some microfluidic pathways are formed through the rigid body portion from the top surface to the bottom surface.

Each diaphragm valve 100 is configurable to either provide a fluid pathway between the first fluid pathway 112 and the second fluid pathway 114, or to block the fluid pathway between the first fluid pathway 112 and the second fluid pathway 114. In some embodiments, the fluid pathway is provided by applying a vacuum to the valve membrane 130, thereby opening the diaphragm valve 100, and the fluid pathway is blocked by applying pressure to the valve membrane 130, thereby closing the diaphragm valve 100.

Figure 8:
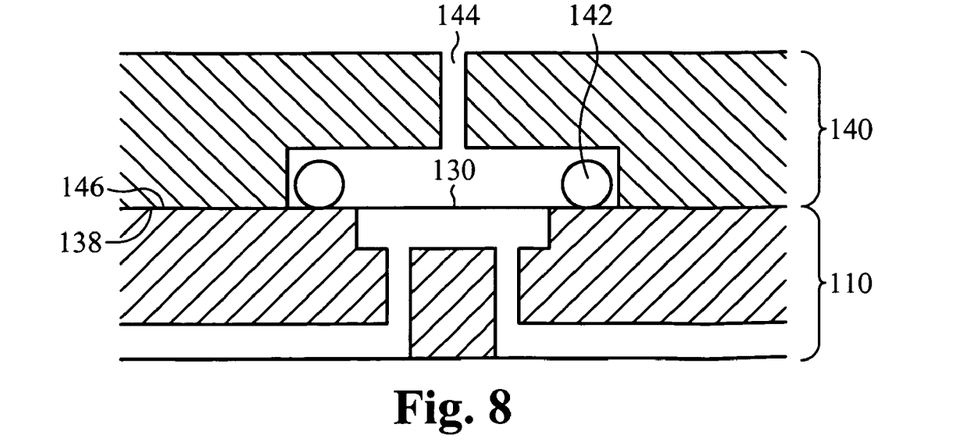
FIG. 8 illustrates an exemplary configuration for actuating the diaphragm valve.

FIG. 8 illustrates an exemplary configuration for actuating the diaphragm valve 100. A manifold 140 is coupled to the diaphragm valve 100 such that a bottom surface 146 of the manifold 140 is in contact with the top surface 138 of the diaphragm valve 100. The manifold 140 includes an o-ring 142 configured to be positioned against the top surface 138. The o-ring 142 is also configured to have a perimeter greater than a perimeter of the recessed valve area 122, thereby forming the valve membrane 130 within the perimeter of the o-ring 142. In such a configuration, a surface area of the valve membrane 130 is greater than a cross-sectional area of the recessed valve area 122.

The manifold 140 also includes an air passage 144 through which a pressure or a vacuum can be applied. The air passage 144 is aligned with the valve membrane 130. In some embodiments, the air passage 144 is aligned with the center of the valve membrane 130. A pressure/vacuum line (not shown) is coupled to the air passage 144.

Figure 9:
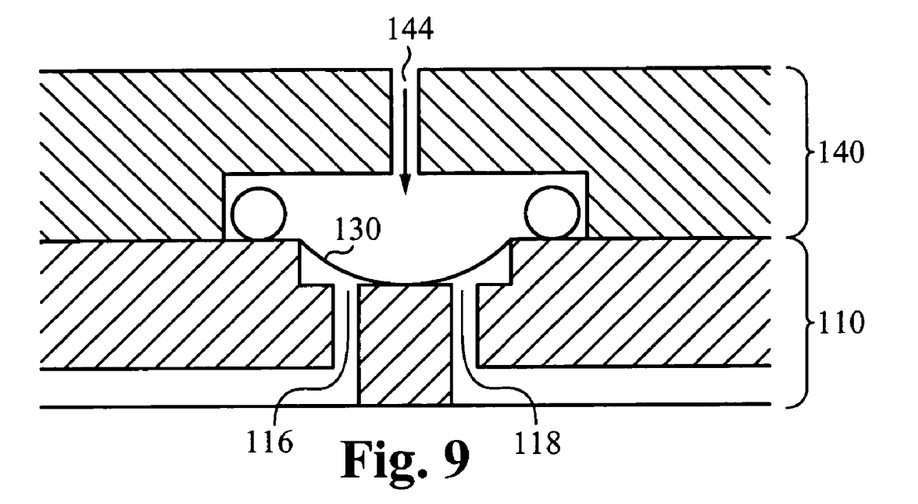
FIG. 9 illustrates the diaphragm valve of FIG. 8 actuated to a closed position.

FIG. 9 illustrates the diaphragm valve 100 actuated to a closed position. To close the diaphragm valve 100, air pressure is provided via the air passage 144. The air pressure forces the valve membrane 130 to a bottom surface of the recessed valve area 122, thereby blocking the fluid pathway between the fluid inlet end 116 and the fluid outlet end 118. In some embodiments, the valve membrane 130 covers the fluid inlet end 116, the fluid outlet end 118, or both, when the diaphragm valve 100 is closed.

Figure 10:
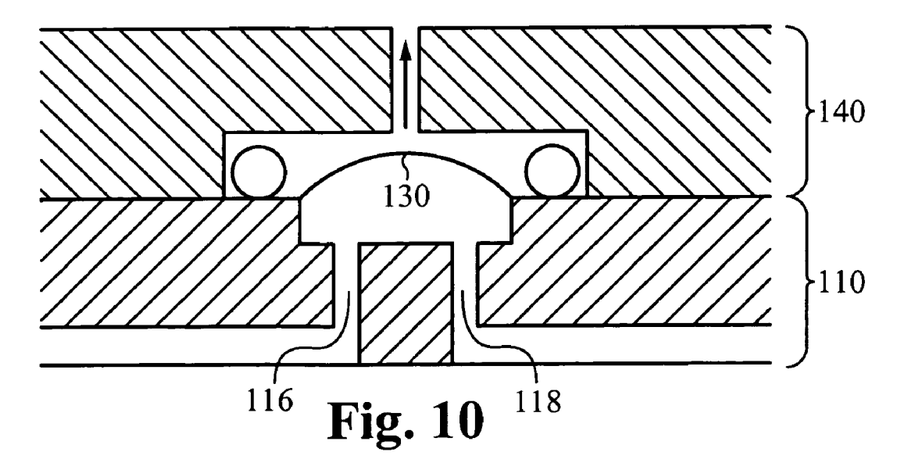
FIG. 10 illustrates the diaphragm valve of FIG. 8 actuated to an open position.

FIG. 10 illustrates the diaphragm valve 100 actuated to an open position. To open the diaphragm valve 100, a vacuum is applied via the air passage 144. The vacuum forces the valve membrane 130 away from the recessed valve area 122, thereby opening the fluid pathway between the fluid inlet end 116 and the fluid outlet end 118. In some embodiments, the valve membrane 130 does not block the fluid pathway between the fluid inlet end 116 and the fluid outlet end 118 when the valve membrane 130 is in a non-actuated state. That is, when neither pressure nor vacuum is applied to the valve membrane 130, the fluid pathway between the fluid inlet end 116 and the fluid outlet end 118 is open. In this case, application of a vacuum is not necessary. Alternatively, a vacuum can be applied to improve the volume of the fluid pathway.

Although the valve membrane 130 of FIGS. 6 and 11 is configured as a circle, the shape of the valve membrane 130 can be any shape capable of enabling the opening and closing of the fluid pathway between the inlet end 116 and the outlet end 118 as described above.

The diaphragm valve is described above in terms of two ports, an inlet fluid end and an outlet fluid end. The diaphragm valve can be extended to include more than two ports, for example multiple inlet ports, multiple outlet ports, or multiple inlet ports and multiple outlet ports.

It is understood that although FIGS. 7-10 describe the recessed valve area as being configured in the top surface of the rigid body portion, it is understood the recessed valve area can be configured in the bottom surface of the rigid body portion. It is also understood that an application using a plurality of recessed valve areas, such as the microfluidic cartridge shown in FIG. 11, can include one or more recessed valve areas configured in the top surface of the rigid body portion, and one or more recessed valve areas configured in the bottom surface of the rigid body portion.

The present invention has been described in terms of specific embodiments incorporating details to facilitate the understanding of the principles of construction and operation of the invention. The specific configurations shown and the methodologies described in relation to the valve mechanism are for exemplary purposes only. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A valve mechanism comprising:
   a. a rigid body structure including a first surface extending an entire length of the rigid body structure and at least one recessed valve area configured within the first surface, wherein the rigid body structure further includes a plurality of fluid channels and each recessed valve area includes an inlet end of a first fluid channel and an outlet end of a second fluid channel; and
   b. a membrane cover extending over the entire length of the rigid body structure and sealed to the first surface of the rigid body structure such that each recessed valve area is sealed at the first surface by a portion of the membrane, thereby forming a valve membrane for each recessed valve area, wherein each valve membrane is configured to be actuated into a first position thereby providing a fluidic pathway between the inlet end of the first fluid channel and the outlet end of the second fluid channel, and a second position such that the valve membrane is extended into the recessed valve area thereby blocking the fluidic pathway between the inlet end of the first fluid channel and the outlet end of the second fluid channel.

2. The valve mechanism of claim 1 wherein the valve membrane is extended away from the recessed valve area while in the first position.

3. The valve mechanism of claim 1 wherein the rigid body structure forms a bottom surface and a side perimeter surface of each recessed valve area.

4. The valve mechanism of claim 3 wherein the inlet end of a first fluid channel and the outlet end of the second fluid channel are formed within the rigid body structure.

5. The valve mechanism of claim 1 wherein the rigid body structure further includes a second surface and at least one recessed valve area configured within the second surface, further wherein the second surface is positioned on an opposite side of the rigid body structure as the first surface.

6. The valve mechanism of claim 5 further comprising a second membrane cover sealed to the bottom surface of the rigid body portion, thereby forming a valve membrane for each recessed valve area configured within the bottom surface.

7. The valve mechanism of claim 6 wherein each fluid channel formed within the rigid body structure includes at least one open-side, wherein each open-side is sealed by either the membrane cover sealed to the top surface or the membrane cover sealed to the bottom surface.

8. The valve mechanism of claim 1 wherein the membrane cover includes a first layer and a second layer, wherein the first layer has a higher thermal melting point than the second layer, further wherein the second layer is sealed to the top surface.

9. The valve mechanism of claim 8 wherein the top layer comprises polyester and the second layer comprises polyethylene.

10. The valve mechanism of claim 1 wherein each recessed valve area includes multiple inlet ends corresponding to multiple inlet fluid channels, multiple outlet ends corresponding to multiple outlet fluid channels, or multiple inlet ends corresponding to multiple inlet fluid channels and multiple outlet ends corresponding to multiple outlet fluid channels.

11. A valve mechanism comprising:
   a. a rigid body portion including a plurality of microfluidic channels and one or more recessed valve areas configured within a top surface of the rigid body portion and extending an entire length of the rigid body portion, wherein the rigid body portion forms a bottom surface and a side perimeter surface of each recessed valve area such that a remaining side of each recessed valve area is open-sided, further wherein each recessed valve area includes an inlet end of a first channel and an outlet end of a second channel formed within the rigid body portion; and b. a flexible membrane cover extending over the entire length of the rigid body portion and sealed to the top surface of the rigid body such that each recessed valve area is sealed at the open-side by a portion of the flexible membrane cover, thereby forming a valve membrane for each recessed valve area, wherein each valve membrane is configured to be actuated into at least two positions, a first position such that the valve membrane is extended away from the bottom surface thereby providing a fluidic pathway between the inlet end of the first channel and the outlet end of the second channel, and a second position such that the valve membrane is extended toward the bottom surface thereby blocking the fluidic pathway between the inlet end of the first channel and the outlet end of the second channel.

12. The valve mechanism of claim 11 further comprising one or more recessed valve areas configured within a bottom surface of the rigid body portion, the bottom surface is positioned on an opposite side of the rigid body portion as the top surface, wherein the rigid body portion forms a bottom surface and a side perimeter surface of each recessed valve configured within the bottom surface such that a remaining side of each recessed valve area is open-sided, further wherein each recessed valve area includes an inlet end of one channel and an outlet end of another channel formed within the rigid body portion.

13. The valve mechanism of claim 12 further comprising a second flexible membrane cover sealed to the bottom surface of the rigid body portion, thereby forming a valve membrane for each recessed valve area configured within the bottom surface.

14. The valve mechanism of claim 13 wherein each microfluidic channel formed within the rigid body portion includes at least one open-side, wherein each open-side is sealed by either the flexible membrane sealed to the top surface or the flexible membrane sealed to the bottom surface.

15. The valve mechanism of claim 11 wherein the flexible membrane includes a first layer and a second layer, wherein the first layer has a higher thermal melting point than the second layer, further wherein the second layer is sealed to the top surface.

16. The valve mechanism of claim 15 wherein the top layer comprises polyester and the second layer comprises polyethylene.

17. The valve mechanism of claim 11 wherein each recessed valve area includes multiple inlet ends corresponding to multiple inlet fluid channels, multiple outlet ends corresponding to multiple outlet fluid channels, or multiple inlet ends corresponding to multiple inlet fluid channels and multiple outlet ends corresponding to multiple outlet fluid channels.

18. A valve system comprising:
a. a fluidic cartridge comprising:
  i. a rigid body structure including a first surface extending an entire length of the rigid body structure and a plurality of recessed valve areas configured within the first surface, wherein the rigid body structure further includes a plurality of fluid channels and each recessed valve area includes an inlet end of a first fluid channel and an outlet end of a second fluid channel; and ii. a membrane cover extending over the entire length of the rigid body structure and sealed to the first surface of the rigid body structure such that each recessed valve area is sealed at the first surface by a portion of the membrane, thereby forming a valve membrane for each recessed valve area, wherein each valve membrane is configured to be actuated into a first position thereby providing a fluidic pathway between the inlet end of the first fluid channel and the outlet end of the second fluid channel, and a second position such that the valve membrane is extended into the recessed valve area thereby blocking the fluidic pathway between the inlet end of the first fluid channel and the outlet end of the second fluid channel; and b. a manifold coupled to the fluidic cartridge, wherein the manifold includes a plurality of air passages, at least one air passage is aligned with each recessed valve area, further wherein the manifold is configured to apply air pressure to select ones of the plurality of recessed valve areas thereby actuating the corresponding valve membranes into the second position.

19. The valve system of claim 18 wherein the first position of the valve membrane is a position external to the recessed valve area such that the valve membrane is extended away from the recessed valve area.

20. The valve system of claim 19 wherein the manifold is further configured to apply vacuum to select one of the plurality of recessed valve area thereby actuating the corresponding valve membranes into the first position.

21. The valve system of claim 18 wherein the rigid body structure forms a bottom surface and a side perimeter surface of each recessed valve area.

22. The valve system of claim 21 wherein the inlet end of the first fluid channel and the outlet end of the second fluid channel are formed within the rigid body structure.

23. The valve system of claim 18 wherein the rigid body structure further includes a second surface and at least one recessed valve area configured within the second surface, further wherein the second surface is positioned on an opposite side of the rigid body structure as the first surface.

24. The valve system of claim 23 further comprising a second membrane cover sealed to the bottom surface of the rigid body portion, thereby forming a valve membrane for each recessed valve area configured within the bottom surface.

25. The valve system of claim 24 wherein each fluid channel formed within the rigid body structure includes at least one open-side, wherein each open-side is sealed by either the membrane cover sealed to the top surface or the membrane cover sealed to the bottom surface.

26. The valve system of claim 18 wherein the membrane cover includes a first layer and a second layer, wherein the first layer has a higher thermal melting point than the second layer, further wherein the second layer is sealed to the top surface.

27. The valve system of claim 26 wherein the top layer comprises polyester and the second layer comprises polyethylene.

28. The valve system of claim 18 wherein each recessed valve area includes multiple inlet ends corresponding to multiple inlet fluid channels, multiple outlet ends corresponding to multiple outlet fluid channels, or multiple inlet ends corresponding to multiple inlet fluid channels and multiple outlet ends corresponding to multiple outlet fluid channels.

* * * * *